United States Patent
Hashimoto et al.

(10) Patent No.: US 10,965,225 B2
(45) Date of Patent: Mar. 30, 2021

(54) MOTOR CONTROL DEVICE (71) Applicant: OMRON Corporation, Kyoto (JP)

(72) Inventors: Minoru Hashimoto, Ritto (JP); Tetsuya Akagi, Kyoto (JP); Ryuichi Jimbo, Kusatsu (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 16/477,900

(22) PCT Filed: Feb. 20, 2018

(86) PCT No.: PCT/JP2018/005951
§ 371 (c)(1),
(2) Date: Jul. 14, 2019

(87) PCT Pub. No.: WO2018/155424
PCT Pub. Date: Aug. 30, 2018

(65) Prior Publication Data
US 2019/0363650 A1    Nov. 28, 2019

(30) Foreign Application Priority Data
Feb. 21, 2017 (JP) .............................. JP2017-030369

(51) Int. Cl.
*H02P 3/18* (2006.01)
*G05B 9/02* (2006.01)
*H02P 29/024* (2016.01)

(52) U.S. Cl.
CPC .................. *H02P 3/18* (2013.01); *G05B 9/02* (2013.01); *H02P 29/027* (2013.01)

(58) Field of Classification Search
CPC ................ H02P 3/18; G05B 9/02; G05B 9/00
See application file for complete search history.

(56) References Cited

U.S. PATENT DOCUMENTS 7,525,273 B2 * 4/2009 Hashimoto .......... H01H 47/002
318/519
8,659,254 B2 * 2/2014 Ueno ................. G05B 19/4062
318/490
(Continued)

FOREIGN PATENT DOCUMENTS

EP    1705539    9/2006
EP    1806761    7/2007
(Continued)

OTHER PUBLICATIONS

"International Search Report (Form PCT/ISA/210) of PCT/JP2018/005951," dated Apr. 17, 2018, with English translation thereof, pp. 1-5.
(Continued)

*Primary Examiner* — Bickey Dhakal
(74) *Attorney, Agent, or Firm* — JCIPRNET (57) ABSTRACT

This motor control devices provided with: a motor control unit which generates a command value on the basis of a motor drive command acquired from a PLC over a communication line; a drive unit which supplies motor drive voltage according to the command value; an interruption unit which interrupts transmission of the drive signal to the motor; a safety input unit which receives an emergency stop input operation over a control signal line; a reset input unit which receives a reset input operation; a determination unit which determines whether or not safety is maintained on the basis of input to the safety input unit; and a safety control unit which, when the safety input unit receives an emergency stop input operation, performs interruption processing of the drive signal through the interruption unit, and when the reset input unit receives a reset input operation, performs restart processing if safety is maintained.

12 Claims, 9 Drawing Sheets

(56) References Cited

U.S. PATENT DOCUMENTS

| | | | | |
|---|---|---|---|---|
| 2008/0082212 A1* | 4/2008 | Kato | ................... | G05B 19/058 |
| | | | | 700/259 |
| 2009/0198379 A1* | 8/2009 | Komuro | ................ | B25J 9/1674 |
| | | | | 700/250 |
| 2017/0254325 A1* | 9/2017 | Tajima | ................... | G05B 9/02 |

FOREIGN PATENT DOCUMENTS

| | | | | |
|---|---|---|---|---|
| EP | 3203627 A1 * | 8/2017 | ............ | H02P 29/027 |
| JP | H111113274 | 4/1999 | | |
| JP | 2005157667 | 6/2005 | | |
| JP | 2006040195 | 2/2006 | | |
| JP | 2007181885 | 7/2007 | | |
| JP | 2008282342 | 11/2008 | | |
| JP | 2009184048 | 8/2009 | | |
| JP | 2009266038 | 11/2009 | | |
| JP | 2011192015 | 9/2011 | | |
| JP | 2016073095 | 5/2016 | | |
| JP | 2016206842 | 12/2016 | | |
| WO | 2016051552 | 4/2016 | | |

OTHER PUBLICATIONS

"Written Opinion of the International Searching Authority (Form PCT/ISA/237) of PCT/JP2018/005951," dated Apr. 17, 2018, with English translation thereof, pp. 1-10.
"International Preliminary Examining Authorities (Form PCT/IPEA/408) of PCT/JP2018/005951," completed on Mar. 12, 2019, with English translation thereof, pp. 1-12.
"Search Report of Europe Counterpart Application", dated Dec. 11, 2020, pp. 1-12.

* cited by examiner

MOTOR CONTROL DEVICE

CROSS-REFERENCE TO RELATED APPLICATION

This application is a 371 application of the International PCT application serial no. PCT/JP2018/005951, filed on Feb. 20, 2018, which claims the priority benefits of Japan Patent Application No. 2017-030369, filed on Feb. 21, 2017. The entirety of the above-mentioned patent applications is hereby incorporated by reference herein and made a part of this specification.

TECHNICAL FIELD

The present invention relates to a motor control device that drives and controls a motor.

BACKGROUND ART

In recent years, a servo system has been used for, for example, positioning control of operating units in various machines at manufacturing sites. An example of such a servo system includes a system including a servo motor for operating various mechanical devices, an encoder attached to the servo motor, a servo driver for driving the servo motor, and a control device for outputting position command information or the like to the servo driver. Efforts to ensure the safety of workers together with cost reduction and improvement in productivity are becoming important requirements at manufacturing sites. Therefore, a servo system is also required to be suitable for corresponding safety standards.

A servo driver including a safe torque off (STO) function of interrupting a drive current that is supplied to a servo motor in response to an interrupting signal from the outside in order to ensure safety at the time of using the servo motor is known (Patent Literature 1). Further, it is necessary for a stop command to be reliably transferred to the servo driver when a user presses an emergency stop switch, and a safety controller is used for this purpose.

Figure 9:
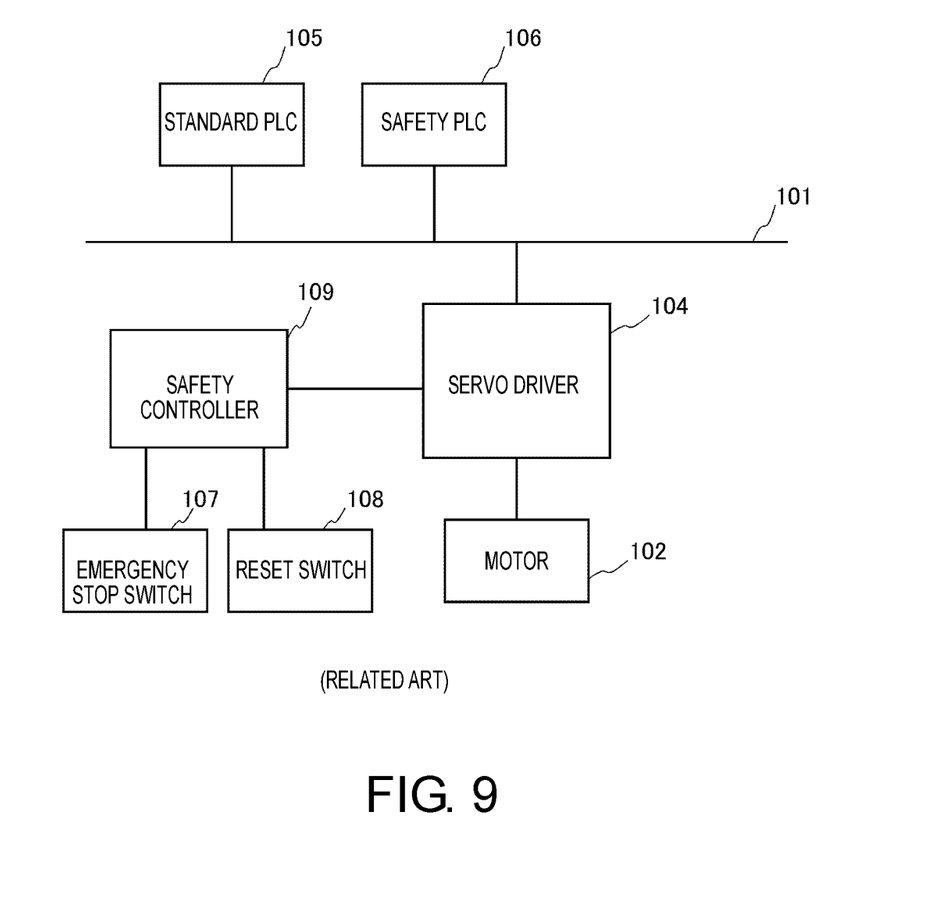
FIG. 9 is a diagram illustrating a schematic configuration of a servo system using a safety controller according to the related art.

A configuration of a system of the related art with an STO function is illustrated in FIG. 9. In this system, a servo driver 104, a standard programmable logic controller (PLC) 105, and a safety PLC 106 are connected via a network line (a communication line) 101, and the servo driver 104 drives a motor 102 on the basis of a drive command from the standard PLC 105. The safety PLC 106 transfers a command regarding safety such as for emergency stopping to the servo driver 104 via the network line 101. Further, an emergency stop switch 107 is connected to a safety controller 109, and when the emergency stop switch 107 is pressed, a stop command is transferred from the safety controller 109 to the servo driver 104 via an external wiring (a control line). The emergency stop switch 107 has redundant contact portions in order to satisfy safety standards, and the safety controller 109 has a function of determining whether the emergency stop switch 107 has operated normally and maintains safety. The safety controller 109 does not permit a re-operation of the servo driver 104 even when the reset switch 108 is pressed in a case in which safety is not maintained.

CITATION LIST

Patent Literature

[Patent Literature 1] Japanese Laid-open No. 2016-73095

SUMMARY

Technical Problem

As described above, a method in which a servo driver acquires a stop command in the system of the related art includes two methods including a method of acquiring the stop command from the safety PLC via the network and a method of acquiring the stop command from the safety controller via external wiring. In the method of acquiring the stop command via a network, there is a problem that a network delay occurs and it takes time to stop the output. On the other hand, in the method of acquiring the stop command via external wiring, there is no problem of a network delay, but there is a problem that a safety controller separate from the servo driver is necessary and a system configuration or a control method therefor become complicated.

The present invention has been made in view of such problems, and an object of the present invention is to provide a motor control device capable of performing emergency stopping rapidly without causing deterioration in safety or complication of a system configuration.

Solution to Problem

In the present invention, a function of receiving an emergency stop signal, which is included in a safety controller of the related art, is incorporated into a motor control device in order to solve the above problems. With such a configuration, it is possible to realize both shortening of a time from generation of an emergency stop signal to stopping of output and simplification of a system configuration and a control method therefor.

Specifically, a motor control device according to an aspect of the present invention includes a motor control unit, a drive unit, an interruption unit, a safety input unit, a reset input unit, a determination unit, and a safety control unit. The motor control unit generates a command value for driving the motor on the basis of a motor drive command acquired from a PLC via a communication line. The drive unit supplies a drive current for driving the motor to the motor according to the command value from the motor control unit. The interruption unit interrupts transfer of a drive signal to the motor.

The safety input unit receives an emergency stop input operation from a user via a control signal line different from the communication line. When the safety input unit receives the emergency stop input operation, the safety control unit executes a process of interrupting the drive signal.

The reset input unit receives a reset input operation from the user. The reset input unit may acquire a reset input signal from the safety PLC via the communication line, or may acquire a reset input signal via the control signal line different from the communication line. When the reset input unit receives the reset input operation and the safety is maintained, the safety control unit executes a re-activation process.

The determination unit determines whether safety is maintained on the basis of a change in a state of an input to the safety input unit. In the present disclosure, "safety is maintained" means a state in which security is secured and, more clearly, a state in which predetermined safety requirements are satisfied. Typically, a state in which no failure occurs in any of components is a state in which the predetermined safety requirements are satisfied, and thus, a state in which the safety is maintained.

The safety control unit executes a process of interrupting the drive signal through the interruption unit when the safety input unit receives the emergency stop input operation. An output of the drive signal to the motor is stopped through the interrupting process. Further, when the reset input unit receives the reset input operation and safety is maintained, re-activation processing is performed. The output of the drive signal to the motor is resumed through the re-activation process. Here, when the determination unit determines that safety is not maintained, the re-activation process is not performed even when there is the reset input operation, thereby preventing re-activation of the system in a state in which security cannot be secured.

With such a configuration, a function of securing safety regarding the emergency stop switch is provided in the motor control device, and the safety controller of the related art is not necessary. Therefore, since the stop command is acquired via the control signal line, it is possible to achieve rapid emergency stopping and prevent a system configuration from being complicated.

In the aspect, the input to the safety input unit may be duplexed as a first input and a second input, and the determination unit may determine that safety is maintained when a correlation between the first input and the second input satisfies a predetermined condition, and determine that safety is not maintained otherwise. An example of the "predetermined condition" is a correlation condition of the first input and the second input that is assumed to occur when no failure occurs in any component of the emergency stop switch. With such a configuration, even when a single failure occurs in the emergency stop switch, emergency stopping is possible, and re-activation in such a state can be prevented.

The reset input unit may receive a signal indicating that the user has performed the reset input operation from a safety PLC via the communication line. Since a rapid response is not required for the resetting process, no problem occurs even when the input is via the communication line, and an effect of reducing the number of terminals of the motor control device can be obtained by omitting the input via the control signal line. However, the reset input unit may receive the reset input operation from the user via a control signal line different from the communication line. Thus, the reset switch can be disposed near the emergency stop switch. Further, the reset input unit may receive the reset input operation via two systems, that is, via communication line and via a control signal line.

The motor control device according to the present aspect may further include a notification unit that notifies the safety PLC that the safety is not maintained. With this configuration, the safety PLC can perform a process such as notification of an error to the user.

Further, the notification unit may also notify the PLC of transition of an input to the safety input unit or an input to the reset input unit. With this configuration, the PLC can determine a component that has failed or a failure that has occurred on the basis of the transition of the input, and perform a process according thereto. This is a function that cannot be realized when the safety controller of the related art is adopted. This is because the safety controller of the related art only notifies the motor control device of a stop command or a re-activation command, and the motor control device is not notified of transition of the input to the safety input unit or the reset input unit.

It should be noted that the present invention can be understood as a motor control device having at least some of the above functions. The present invention can also be understood as a motor control system including the motor control device, the motor, and the PLC described above. Furthermore, the present invention can also be understood as a control method for executing at least some of the above processes. Further, the present invention can be understood as a computer program for causing a computer to execute this method, or a computer-readable storage medium storing this computer program non-temporarily. Each of the above means and processes can be combined with one another as far as is possible to constitute the present invention.

Advantageous Effects of Invention

In the motor control device, it is possible to perform rapid emergency stopping without causing deterioration in safety or complication of a system configuration.

DESCRIPTION OF THE EMBODIMENTS

First Embodiment

[System Configuration]

Figure 1:
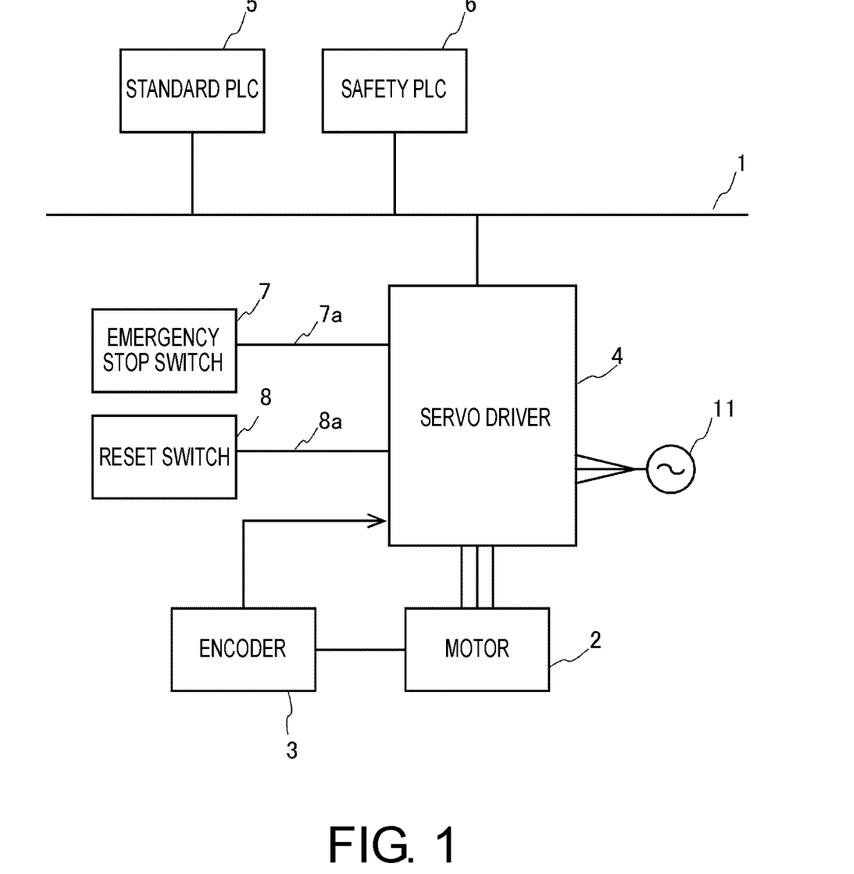
FIG. 1 is a diagram illustrating a schematic configuration of a servo system in which a servo driver according to an embodiment is incorporated.

FIG. 1 is a schematic configuration diagram of a servo system in which a servo driver corresponding to a motor control device of the present invention is incorporated. The servo system includes a network 1, a motor 2, an encoder 3, a servo driver 4, a standard programmable logic controller (PLC) 5, a safety PLC 6, an emergency stop switch 7, and a reset switch 8. The motor 2 and the encoder 3 form a servo motor. The servo system is a system for driving the motor 2, and the motor 2 is incorporated in various mechanical devices (for example, an arm and a conveying device of an industrial robot) (not illustrated) as an actuator for the devices. For example, the motor 2 may be an AC motor. The encoder 3 is attached to the motor 2 in order to detect an operation of the motor 2. The encoder 3 generates a feedback signal indicating the detected operation of the motor 2 and transmits the feedback signal to the servo driver 4. The feedback signal includes, for example, positional information on a rotational position (angle) of a rotational shaft of the motor 2, and information on a rotational speed of the rotational shaft. A general incremental encoder or absolute encoder can be applied to the encoder 3.

The servo driver 4 receives an operation command signal regarding an operation (motion) of the motor 2 from the standard PLC 5 through the network 1 (a communication line), and receives the feedback signal output from the encoder 3. The servo driver 4 executes servo control on the driving of the motor 2 on the basis of the operation command signal from the standard PLC 5 and the feedback signal from the encoder 3. Further, the servo driver 4 is also connected to the safety PLC 6 via the network 1. Accordingly, the servo driver 4 performs monitoring of occurrence of an abnormality regarding the motor 2 or the servo driver 4 on the basis of the monitoring command signal received from the safety PLC 6, and sends a result of monitoring to the safety PLC 6.

Further, the servo driver 4 calculates a command value regarding the operation of the motor 2 on the basis of the operation command signal from the standard PLC 5 and the feedback signal from the encoder 3. Further, the servo driver 4 supplies a drive current to the motor 2 so that the operation of the motor 2 follows the command value. It should be noted that AC power to be sent from the AC power supply 11 to the servo driver 4 is used for the supplied current. In the example, the servo driver 4 is of a type that receives a three-phase AC current, but may be of a type that receives a single-phase AC current.

The servo driver 4 also receives input operation signals of the emergency stop switch 7 and the reset switch 8 from the emergency stop switch 7 and the reset switch 8 via external wirings 7a and 8a (control signal lines). The servo driver 4 stops the supply of the drive current to the motor 2 when the operation signal of the emergency stop switch 7 is received. Further, the servo driver 4 determines whether the safety is secured regarding the emergency stop switch on the basis of transition of the input from the emergency stop switch 7, and resumes the supply of the drive current to the motor 2 under the condition that the safety is secured when the operation signal of the reset switch is received.

<<Servo Driver>>

Figure 2:
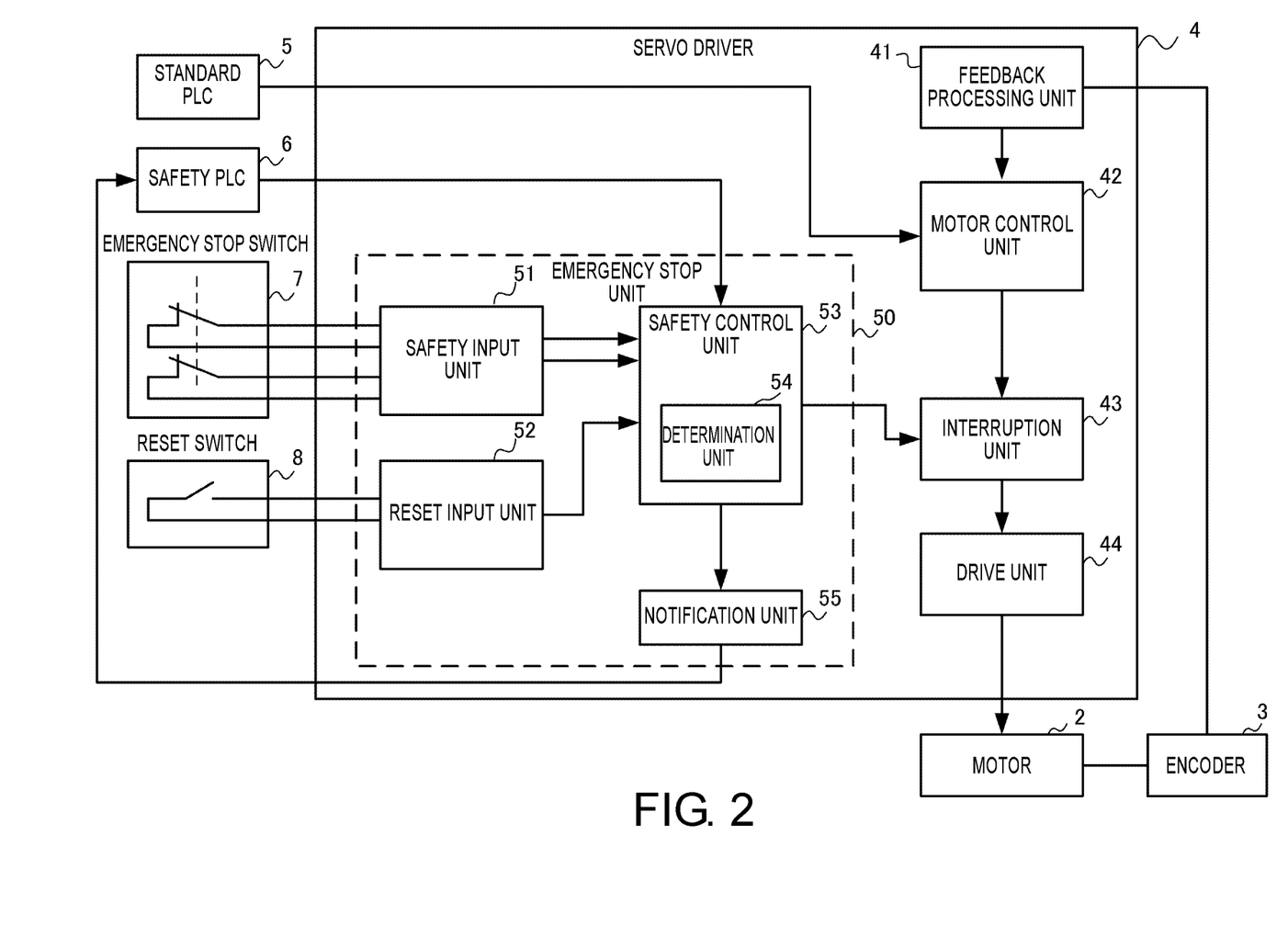
FIG. 2 is a functional block diagram of the servo driver according to the embodiment.

Hereinafter, a more specific configuration of the servo driver 4 will be described. FIG. 2 is a functional block diagram of the servo driver 4. As illustrated in FIG. 2, the servo driver 4 includes a feedback processing unit 41, a motor control unit 42, an interruption unit 43, a drive unit 44, and an emergency stop unit 50.

The feedback processing unit 41 generates a feedback value on the basis of the feedback signal from the encoder 3. For example, when a pulse is output from the encoder 3, the feedback processing unit 41 counts this pulse to calculate a rotational position or a rotational speed of a rotation shaft of the motor 2, and generates a feedback value including a value indicating the position or the speed.

The motor control unit 42 receives the operation command signal from the standard PLC 5 and receives the feedback value from the feedback processing unit 41. The motor control unit 42 generates a command value for executing position feedback control and speed feedback control on the basis of the operation command signal and the feedback value. For example, the motor control unit 42 generates a position command value and a speed command value under feedback control based on the operation command signal and the feedback value. It should be noted that a feedback scheme to be adopted in the feedback control is a scheme in which a servo loop suitable for a predetermined purpose (for example, conveyance of packages) of a mechanical device (for example, a conveyance device) in which the motor 2 is incorporated is formed, and can be appropriately designed. These command values generated by the motor control unit 42 are sent as drive signals to the interruption unit 43.

When the interruption unit 43 receives an interrupting signal from the safety control unit 53 to be described below, the interruption unit 43 stops the drive unit 44 by not electrically passing the drive signal from the motor control unit 42 to the drive unit 44 to be described below. Accordingly, even when the motor control unit 42 transmits the drive signal, the output of the torque in the motor 2 is stopped. On the other hand, when the interrupting signal is not input to the interruption unit 43, the interruption unit 43 passes the drive signal with a command value output from the motor control unit 42 to the drive unit 44 as it is. It should be noted that in the interruption unit 43, two interrupting circuits are connected in series, and the two interrupting circuits are simultaneously interrupted when the interrupting signal is received. With this redundant configuration, it is possible to stop the transmission of the drive signal even when a failure occurs in any one of the interrupting circuits.

The drive unit 44 receives the drive signal from the motor control unit 42 via the interruption unit 43. The drive circuit 44 includes, for example, a circuit including a semiconductor switching element such as an insulated gate bipolar transistor (IGBT), and generates a signal for turning on or off the switching element according to a PWM scheme on the basis of the drive signal from the motor control unit 42, and turns on or off the switching element according to this signal. Accordingly, AC power is supplied to the motor 2 and the motor 2 is driven according to the drive signal. On the other hand, when the interruption unit 43 operates and the transfer of the drive signal to the drive unit 44 is interrupted, the output from the drive unit 44 is fixed to OFF. Accordingly, since the power supply to the motor 2 is stopped, the output of the torque from the motor 2 is stopped.

The emergency stop unit 50 is a functional unit for emergency stopping driving of the motor 2 at the time of an emergency, and includes a safety input unit 51, a reset input unit 52, a safety control unit 53, a determination unit 54, and a notification unit 55.

The safety input unit 51 monitors the contacts of the emergency stop switch 7. The emergency stop switch 7 may be any type such as a push button type, a foot type, or a rope type as long as the emergency stop switch 7 is a 2-channel emergency stop switch. The emergency stop switch 7 has two NC (normally closed) contacts, and when the user operates the emergency stop switch 7, the two NC contacts are opened. The emergency stop switch 7 has a latching mechanism, and when the switch is operated, a state thereof is maintained and the NC contacts remain open. The safety input unit 51 acquires signals of two channels from the emergency stop switch 7 and, accordingly, receives an emergency stop input operation of the user. Hereinafter, the two-channel inputs are also referred to as a first safety input and a second safety input, respectively, as necessary. The safety input unit 51 sends the two-channel input to the safety control unit 53 to be described below.

The reset input unit 52 monitors contacts of the reset switch 8. In order to re-activate the system after an emergency stop, a reset routine is required after the contacts of the emergency stop switch 7 are set to a position of closed. The reset switch 8 has a NO (normally open) contact, and the reset input unit 52 monitors this contact. The reset input unit 52 sends a reset input to the safety control unit 53 to be described below.

The safety control unit 53 controls transfer and interrupting of the drive signal to the servo driver 4. The safety control unit 53 can be realized by a micro processor unit (MPU) executing a program, but may be realized by an application specific integrated circuit (ASIC).

The safety control unit 53 transmits the interrupting signal to the interruption unit 43 when it is determined that the safety of the system is not maintained (an interrupting process). Typically, when the emergency stop switch 7 is operated during the output of the drive signal to the motor 2 and there is a safety input to the safety input unit 51, the safety input unit 51 transmits the interrupting signal to the interruption unit 43 according to the safety input and executes the interrupting process. Since the interruption unit 43 is redundant due to the serial connection of the interrupting circuits as described above, the interruption unit 43 can safely stop the transmission of the drive signal even when a failure occurs in one of paths. The safety control unit 53 also performs the interrupting process when the stop signal is received from the safety PLC 6 via the network 1. Further, when a defect is detected in a component in the servo driver 4 or the motor 2, the safety control unit 53 executes the interrupting process.

The safety control unit 53 stops the output of the interrupting signal to the interruption unit 43 when the reset switch 8 is operated (when the reset input signal is switched from OFF to ON), and resumes the output of the drive signal to the motor 2 (a re-activation process). However, a condition that the determination unit 54 determines that the safety of the system is secured is set in order to start the re-activation process and, in a case in which the security is not secured, the safety control unit 53 does not stop the output of the interrupting signal even when the reset switch 8 is operated.

The determination unit 54 is a sub-functional unit of the safety control unit 53, and determines whether the safety of the servo driver 4 is secured. The determination unit 54 receives an operation signal (the first safety input and the second safety input) of the emergency stop switch 7 from the safety input unit 51 and an operation signal of the reset switch 8 from the reset input unit 52, and determines whether or not the safety of the servo driver 4 is secured on the basis of a correlation between these signals.

A determination logic of the determination unit 54 will be described with reference to FIGS. 3A and 3B. The determination unit 54 first determines that security is secured when both the first safety input and the second safety input are closed within a time defined in advance, with an initial condition that the first safety input and the second safety input are open. When the user releases the emergency stop switch 7, the two NC contacts are closed substantially simultaneously, but there is actually a slight time difference.

Figure 3A:
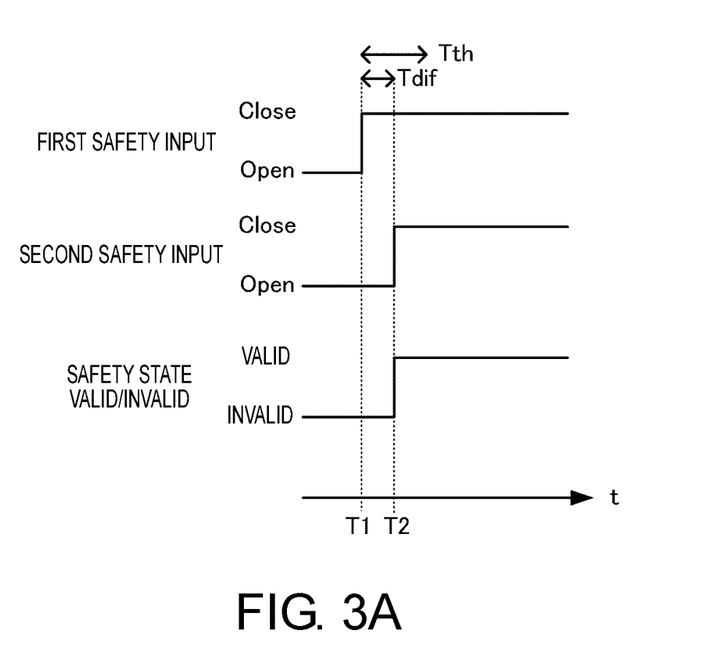
FIGS. 3A and 3B are diagrams illustrating a safety state determination based on an emergency stop switch input.
Figure 3B:
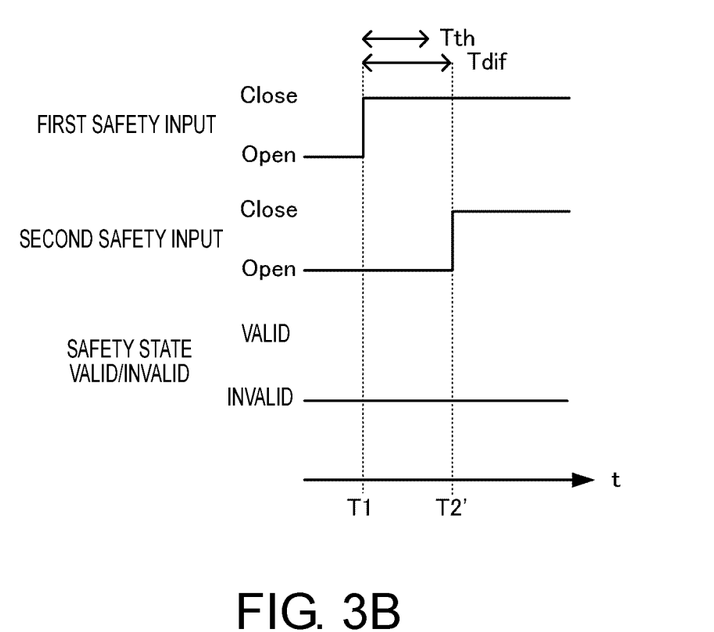

For example, after the first safety input is closed at time T1, the second safety input is closed at time T2, as illustrated in FIG. 3A. When a time difference Tdif=T2−T1 is within a threshold time Tth, the determination unit 54 determines that the security is secured (valid) at time T2. It should be noted that the threshold time Tth is a maximum allowable value (for example, several milliseconds) of a difference between times at which the two contacts are closed when the emergency stop switch 7 has been released. On the other hand, when the difference between times at which the first safety input and the second safety input are closed (Tdif=T2'−T1 in FIG. 3B) is greater than the threshold time Tth as illustrated in FIG. 3B, the determination unit 54 does not determine that the security is secured (kept invalid) even when the first safety input and the second safety input are both closed. When states of the two safety inputs are different, the determination unit 54 determines that the security is not secured (invalid).

Figure 4:
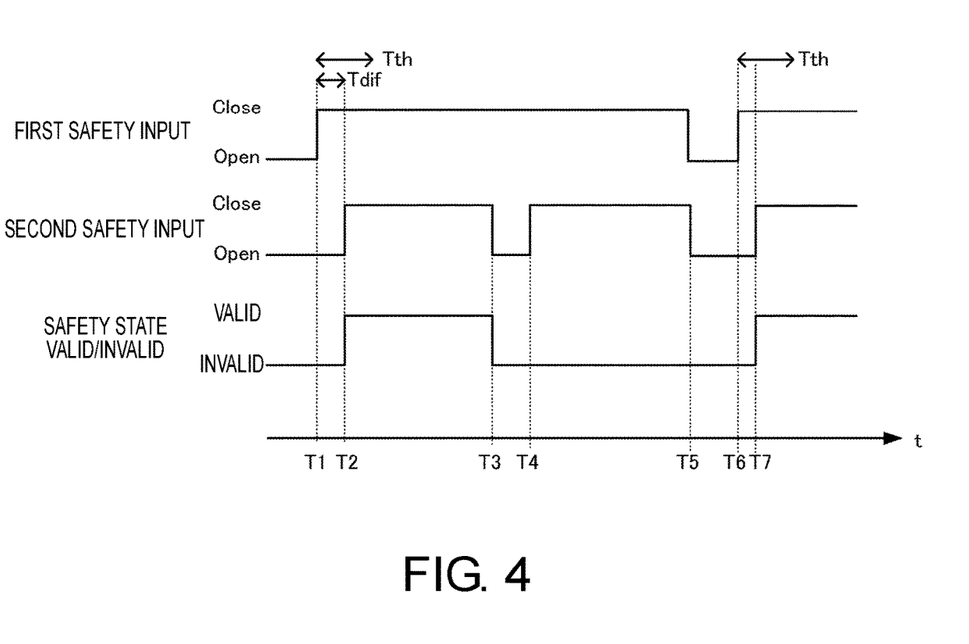
FIG. 4 is a diagram illustrating a safety state determination based on an emergency stop switch input.

The determination logic of the determination unit 54 will be further described with reference to FIG. 4. A determination in a state in which the security is secured, that is, a state in which the two safety inputs are both closed (after time T2 in FIG. 4) will be described herein. The determination unit 54 determines that the security is not secured when the other safety input is open while one of the safety inputs remains closed, and continues to determine that the security is not secured even when the open safety input is then closed. In the example of FIG. 4, the second safety input is open at time T3 and is closed again at subsequent time T4 in a state in which the first safety input remains closed. The determination unit 54 determines that the security is not secured at a time point of time T3. Further, both the safety inputs are closed at time T4, but one of the safety inputs remains closed, and thus, the determination unit 54 determines that the security is not secured. When both the safety inputs are both open at time T5 to return to an initial state, and then, the safety inputs are both closed within the threshold time Tth, the determination unit 54 determines that the security is secured.

It should be noted that although only whether or not the emergency stop function is valid (a component does not fail and a safety standard is satisfied) is considered for simplification in determining whether the safety of the servo driver 4 is secured as described, other elements may be considered. For example, when a failure occurs in any component such as the interruption unit 43 or the encoder 3, the determination unit 54 may determine that the safety of the servo driver 4 is not secured. In order to make such a determination, the determination unit 54 may be notified of a failure monitoring result of each component, and a monitoring method is also known. Detailed description thereof will be omitted.

When the determination unit 54 determines that the security is not secured, the notification unit 55 notifies the safety PLC 6 of the fact through an error notification via the network 1. The error notification may simply indicate that security is not secured, but it is desirable to include more detailed information. For example, the notification unit 55 may notify the safety PLC 6 of transition of the input received by the safety input unit 51 or transition of the input received by the reset input unit 52. The safety PLC 6 can use such information to determine a component that has failed or a failure that has occurred. For example, when one of the two safety inputs remains closed and the other is open, a determination can be made that the closed terminal fails (for example, short circuit), and a determination can be made that a defect has occurred even when a time difference from open to closed is greater than a threshold time. Further, when there is a reset input while the safety input remains open, a determination can be made that there is an error in a reset procedure. It should be noted that the notification unit 55 may perform failure analysis and notify the safety PLC 6 of a result thereof, instead of the safety PLC 6 being notified of the transition of the input and the safety PLC 6 performing the failure analysis.

OPERATION EXAMPLE

In a case in which there is no failure in the emergency stop switch 7, the two NC contacts are both open when the emergency stop switch 7 is operated during driving of the motor 2, and the safety control unit 53 executes the interrupting process in response thereto to stop the output of the drive signal to the motor 2. Through the notification from the notification unit 55, the safety PLC 6 can ascertain that the emergency stop has been performed since the emergency stop switch 7 has been operated, and notifies the user of the fact or a procedure for re-activation. In the re-activation, the user first releases the emergency stop switch 7, and thus, both of the NC contacts change from open to closed. Thereafter, when the user operates the reset switch 8, the safety control unit 53 executes the re-activation process to resume the output of the drive signal to the motor 2. It should be noted that, even when the reset switch 8 is operated without releasing the emergency stop switch 7, the safety control unit 53 does not execute the re-activation process. In this case, through the notification from the notification unit 55, the safety PLC 6 can ascertain that the reset switch 8 is operated without releasing the emergency stop switch 7, and notifies the user of the fact or a correct procedure of the re-activation.

Next, a case in which one channel or one safety input of the emergency stop switch 7 remains closed, for example, due to a short circuit between terminals is considered. When the emergency stop switch 7 is operated during driving of the motor 2, a non-welded contact is open, and in response thereto, the safety control unit 53 executes the interrupting process to stop the output of the interrupting signal to the motor 2. Through the notification from the notification unit 55, the safety PLC 6 can ascertain that one of the contacts remains closed, that is, welding is occurring. Therefore, the safety PLC 6 notifies the user that the emergency stop switch 7 has failed. In this state, even when the user tries to re-activation and releases the emergency stop switch 7, a condition that the two NC contacts both become open and then closed is not satisfied, and thus, the determination unit 54 can detect that a failure has occurred in the emergency stop switch 7 and determines that the security is not secured. Thereafter, even when the reset switch 8 is operated, the safety control unit 53 does not execute the re-activation process since the safety is not secured, and therefore, it is possible to prevent the re-activation in a state in which the emergency stop switch 7 fails. Although the welding is taken as an example herein, it is possible to similarly prevent the re-activation while the failure is left even in a case in which other failures such as short circuit or disconnection have occurred.

Advantage of Embodiment

According to the embodiment, since the input from the emergency stop switch 7 is received via the control signal line, no transmission delay via the network 1 occurs, and the output of the drive signal can be rapidly stopped after the emergency stop switch 7 is operated. Further, in the embodiment, since the safety of the emergency stop switch 7 can be secured in the servo driver 4, the safety controller of the related art is not necessary, and a system configuration or a control method therefor is simplified.

Further, in the embodiment, since the servo driver 4 can directly acquire the inputs from the emergency stop switch 7 and the reset switch 8, it is possible to transfer content of an error to the safety PLC 6 when the error has occurred. The safety PLC 6 can centrally manage error information and present, to the user, information such as a type of error that has occurred and an action to be taken for an error at any place including the emergency stop switch 7. Therefore, troubleshooting is facilitated and convenience for users is improved.

Second Embodiment

Figure 5:
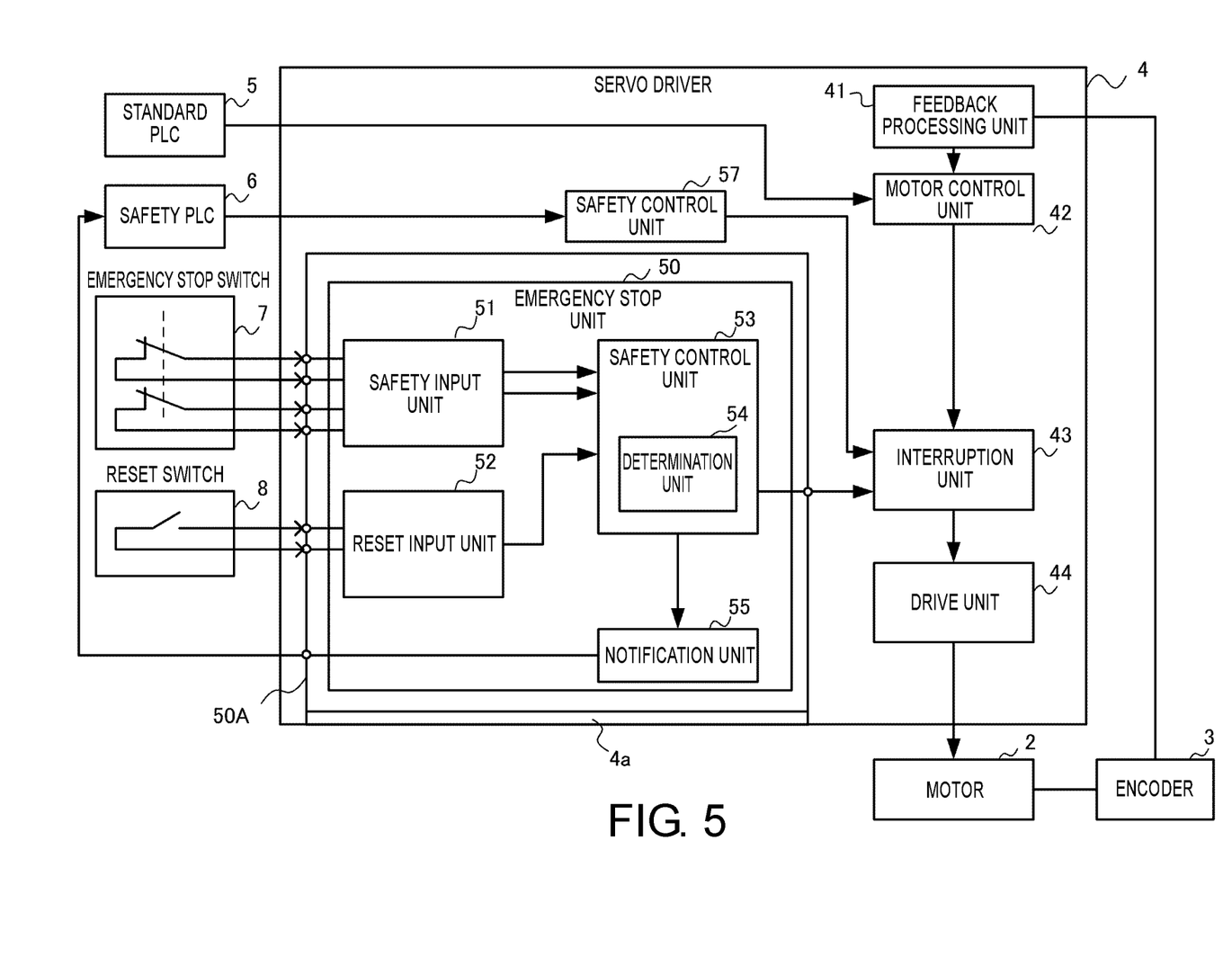
FIG. 5 is a functional block diagram of the servo driver according to the embodiment.

A servo driver 4 according to a second embodiment will be described on the basis of FIG. 5. Among functional units illustrated in FIG. 5, functional units substantially the same as the functional units illustrated in FIG. 2 are denoted by the same reference numerals and detailed description thereof will be omitted.

In the modification example, a feedback processing unit 41, a motor control unit 42, an interruption unit 43, and a drive unit 44, which are functional units directly related to drive control of the motor 2, are disposed on the main body side of the servo driver 4. In this disposition, since the drive unit 44 is disposed under a higher voltage environment than the other functional units, a known appropriate insulation process is performed between the drive unit 44 and the other functional units. On the other hand, a safety control function of the emergency stop unit 50 based on inputs from an emergency stop switch 7 and a reset switch 8 is formed on a safety circuit board 50A. In the modification example, a safety control unit 57 for performing an interrupting signal based on a stop signal from a safety PLC 6 is disposed on the main body side of the servo driver 4. It should be noted that the modification example can be applied to the configuration of the modification example 1 described above.

The circuit board 50A is configured to be removable from the main body via a slot 4a provided on the main body side of the servo driver 4. Therefore, when the circuit board 50A is incorporated into a main body of the servo driver 4 through the slot 4a, electrical contacts of the circuit board 4A and the main body side of the servo driver 4 are designed so that the interruption unit 43 receives the interrupting signal from the safety control unit.

Thus, it is possible to realize an optimal configuration according to system requirements by enabling the safety control function based on the emergency stop switch 7 and the reset switch 8 to be removed. For example, in a case in which emergency stop can be performed at a sufficiently high speed on the basis of the stop signal from the safety PLC 6, addition of the safety circuit board 50A is unnecessary and costs can be reduced.

Modification Example

Figure 6:
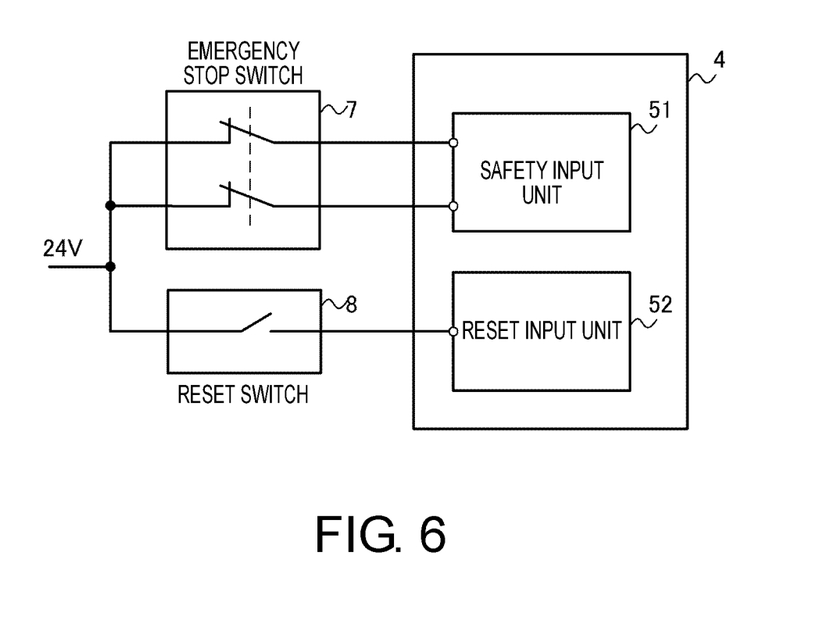
FIG. 6 is a diagram illustrating a modification example of a configuration of inputs of the emergency stop switch and a reset switch.

In the above embodiment, independent power supplies are supplied to two inputs from the emergency stop switch 7 and one input from the reset switch 8 and a failure can be reliably detected when the failure has occurred. However, six terminals are required for the servo driver 4, leading to an increase in a size of the device. Therefore, the number of terminals of the servo driver 4 may be reduced to three by adopting a configuration in which a common power supply is supplied to three inputs as illustrated in FIG. 6.

Further, a situation in which a signal is not OFF may occur due to a short circuit between channels even when the emergency stop switch 7 is operated and the two NC contacts are open. In order to detect such a failure, a test pulse output terminal may be provided, a short OFF pulse may be regularly transmitted, and it may be checked whether the OFF pulse returns. When the OFF pulse returns, a circuit can be diagnosed as being normal, and when the OFF pulse does not return, it can be diagnosed as a short circuit failure of wirings.

Figure 7:
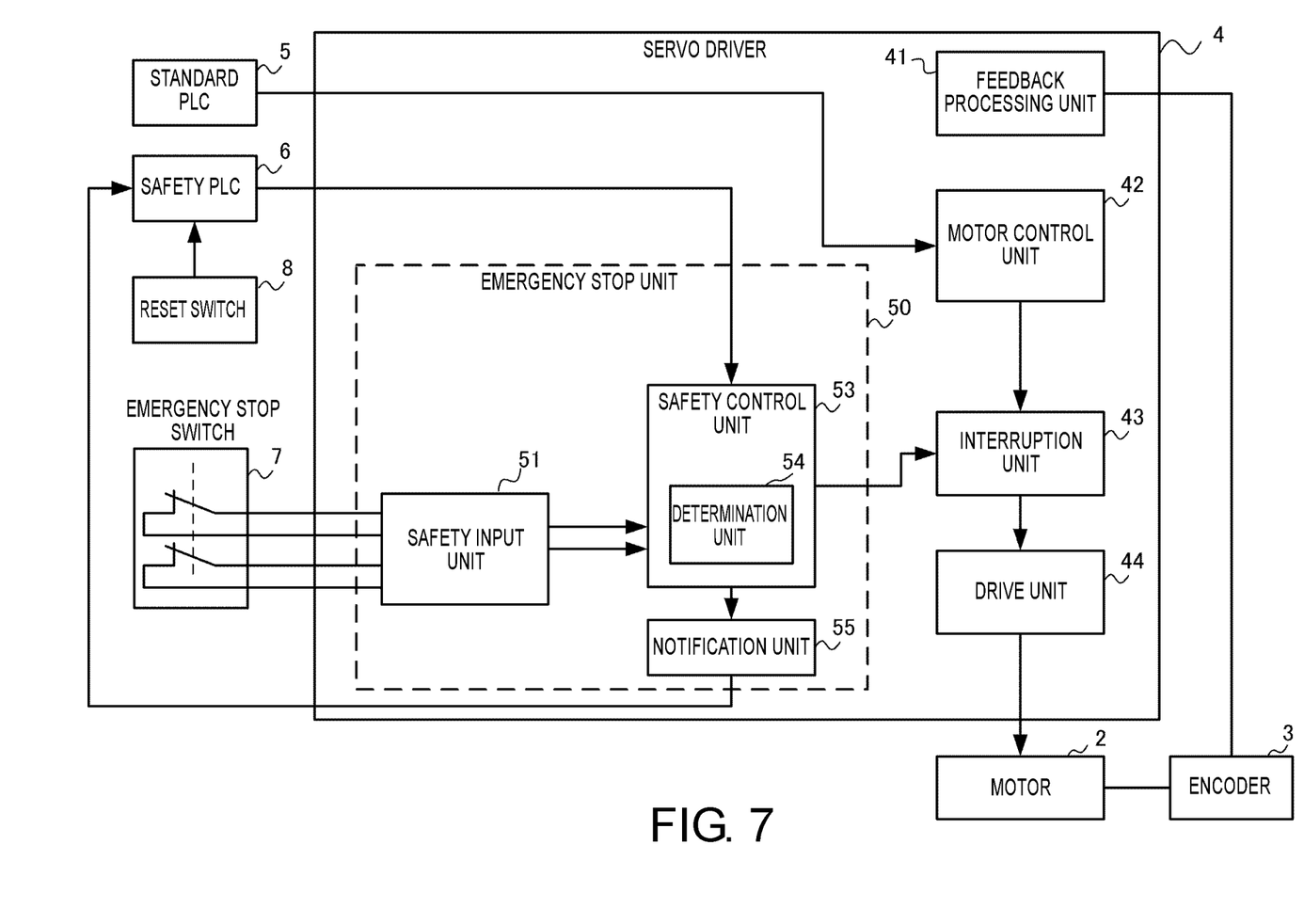
FIG. 7 is a functional block diagram of the servo driver according to the embodiment.

Further, the reset switch 8 may be connected to the safety PLC 6 and the reset signal may be input to the servo driver 4 via a network as illustrated in FIG. 7, instead of the input from the reset switch 8 being input to the servo driver 4 via the control signal line. Since high-speed responsiveness is not required for a reset operation, no severe problem occurs even when a delay due to transmission via the network occurs. On the other hand, there is an advantage that miniaturization can be realized by reducing the number of input terminals of the servo driver 4. In this case, a configuration in which a reset circuit can be added to the servo driver 4 is also effective since a system configuration can be made flexible.

Further, although operating the reset switch 8 after the emergency stop switch 7 is released is required in order to perform the re-activation after emergency stop in the above description, a configuration in which the re-activation is performed without the operation of the reset switch 8 may be adopted according to a required safety standard.

Modification Example 2

Figure 8:
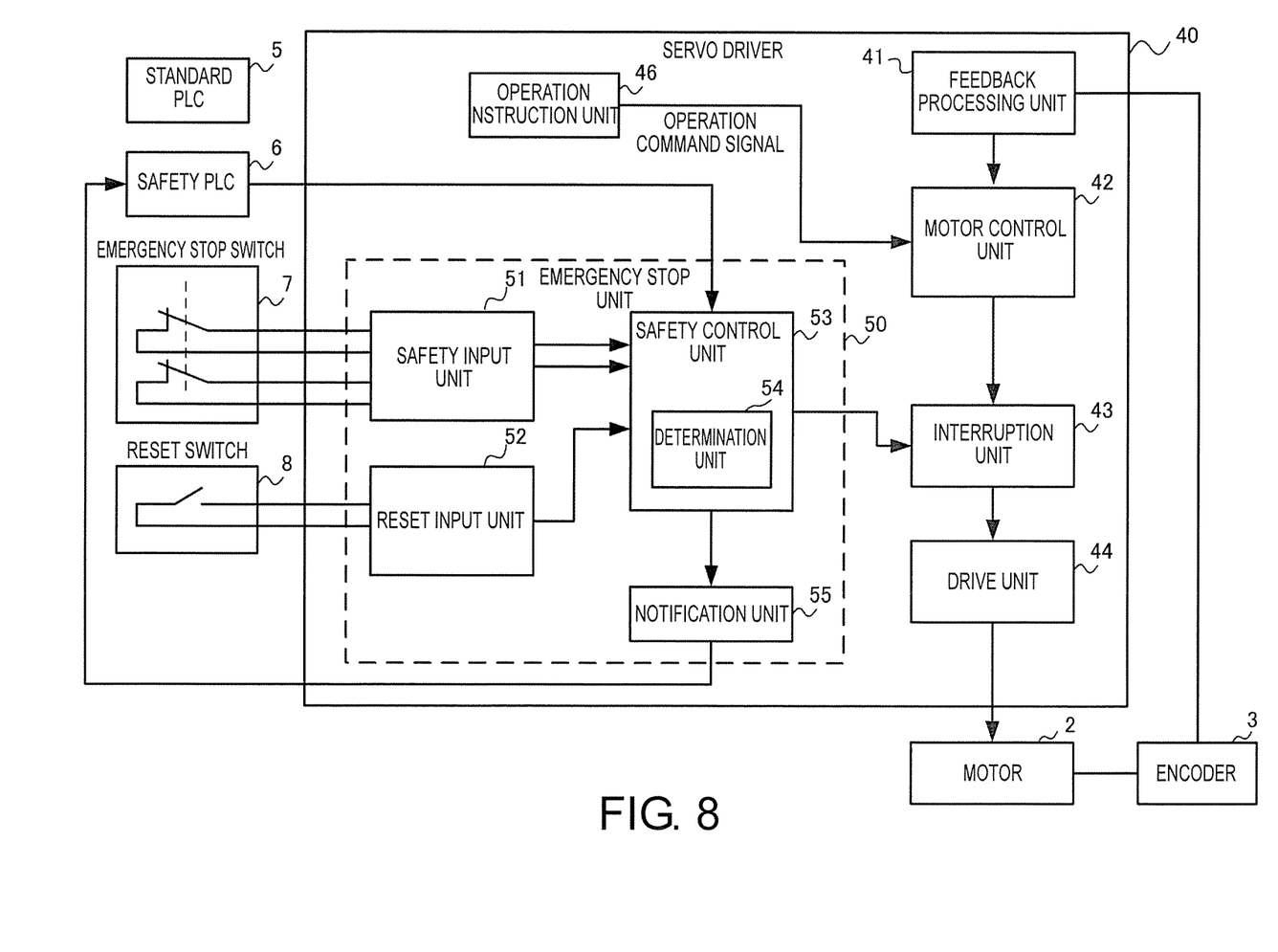
FIG. 8 is a functional block diagram of an inverter according to the embodiment.

Although the servo driver 4 as a motor control device of the present invention is illustrated in the above example, the servo driver 40 illustrated in FIG. 8 can also be adopted as the motor control device in place of the aspect. It should be noted that an induction motor or the like can be illustrated as the motor 2 driven and controlled by the servo driver 40. FIG. 8 is a diagram illustrating functional blocks of the servo driver 40. As illustrated in FIG. 8, the servo driver 40 includes a plurality of functional units. Among the functional units, the functional units substantially the same as the functional units included in the servo driver 4 illustrated in FIG. 2 are denoted with the same reference numerals, and detailed description thereof will be omitted. Specifically, the servo driver also includes a feedback processing unit 41, a motor control unit 42, an interruption unit 43, a drive unit 44, and an emergency stop unit 50, and also includes an operation instruction unit 46.

The operation instruction unit 46 generates the operation command signal for driving the motor 2 on the basis of a request operation given by the user via an input device (not illustrated) in advance. Therefore, no operation command signal is provided from an external device (for example, the standard PLC 5) to the servo driver 40, and the servo driver 40 drives and controls the motor 2 according to a predetermined feedback scheme on the basis of the feedback signal from the encoder 3 and the operation command signal from the operation instruction unit 46. Alternatively, the operation command signal may be provided from the external device to the servo driver 40. In the servo driver 40 configured in this manner, the emergency stop process can be performed on the basis of the safety input from the emergency stop switch 7 by the determination unit 54 included in the emergency stop unit 50, and the torque output from the motor 2 can be stopped by the operation of the interruption unit 43, as in the servo driver 4 described above.

What is claimed is:

1. A motor control device comprising:
a processor that is configured to,
communicate with a PLC via a communication line and generates a command value for driving a motor;
interrupt transfer of a drive signal to the motor;
receive an emergency stop input from an emergency stop switch via a control signal line different from the communication line;
receive a reset input operation from a user;
determine whether safety is maintained on the basis of a change in a state of the emergency stop input; and
execute a process of interrupting the drive signal when the emergency stop input is received, and performs a re-activation process when the reset input operation is received if safety is maintained; and
an insulated gate bipolar transistor that supplies a drive current for driving the motor to the motor according to the command value,
wherein the emergency stop input received from the emergency stop switch is duplexed as a first input and a second input, and
the processor determines that safety is maintained when a time difference between a closing of the first input and a closing of the second input is within a threshold time, and determines that safety is not maintained otherwise.

2. The motor control device according to claim 1, wherein the processor receives a signal indicating that the user has performed the reset input operation from a safety PLC via the communication line.

3. The motor control device according to claim 2, wherein the processor receives the reset input operation from the user via a control signal line different from the communication line.

4. The motor control device according to claim 3,
wherein the processor notifies the PLC that the safety is not maintained.

5. The motor control device according to claim 2,
wherein the processor notifies the PLC that the safety is not maintained.

6. The motor control device according to claim 1, wherein the processor receives the reset input operation from the user via a control signal line different from the communication line.

7. The motor control device according to claim 6,
wherein the processor notifies the PLC that the safety is not maintained.

8. The motor control device according to claim 1,
wherein the processor notifies the PLC that the safety is not maintained.

9. The motor control device according to claim 8, wherein the processor also notifies the PLC of transition of the emergency stop input.

10. The motor control device according to claim 9, wherein the processor also notifies the PLC of transition of the reset input operation.

11. The motor control device according to claim 1,
wherein the processor is provided in a safety circuit board, and
the safety circuit board is removably attached to the main body side of the motor control device.

12. A motor control system comprising:
the PLC;
the motor, and
the motor control device according to claim 1.

* * * * *